(12) United States Patent
Lee

(10) Patent No.: US 6,475,089 B1
(45) Date of Patent: Nov. 5, 2002

(54) GAME SYSTEM

(75) Inventor: Hiroyasu Lee, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/402,090

(22) PCT Filed: Jan. 29, 1999

(86) PCT No.: PCT/JP99/00398

§ 371 (c)(1),
(2), (4) Date: Sep. 29, 1999

(87) PCT Pub. No.: WO99/38590

PCT Pub. Date: Aug. 5, 1999

(30) Foreign Application Priority Data

Jan. 29, 1998 (JP) .......................... 10-031987

(51) Int. Cl.[7] .......................... A63F 13/00; A63F 9/24; G06F 17/00; G06F 19/00
(52) U.S. Cl. .......................... 463/40; 463/23; 463/41; 463/42; 463/43; 700/91; 700/92; 700/93
(58) Field of Search .......................... 463/40, 41, 42, 463/43, 23, 24, 25, 29, 36, 37, 59, 60, 1; 700/90, 91, 92; 709/200, 201, 102, 217, 220, 223, 224, 227; 273/108.1, 237, 148 B, 148 R

(56) References Cited

U.S. PATENT DOCUMENTS

| | | | | |
|---|---|---|---|---|
| 4,210,780 A | * | 7/1980 | Hopkins et al. | 370/80 X |
| 4,958,835 A | * | 9/1990 | Tashiro et al. | 273/85 G X |
| 4,998,199 A | * | 3/1991 | Tashiro et al. | 364/410 X |
| 5,010,553 A | * | 4/1991 | Scheller et al. | 371/35 |
| 5,114,155 A | * | 5/1992 | Tillery et al. | 273/371 X |
| 5,191,585 A | * | 3/1993 | Velazquez | 371/53 |
| 5,311,422 A | * | 5/1994 | Loftin et al. | 364/401 X |
| 5,586,257 A | * | 12/1996 | Perlman | 463/42 X |
| 5,664,778 A | * | 9/1997 | Kikuchi et al. | 273/148 B X |
| 5,697,844 A | * | 12/1997 | Von Kohorn | 463/40 |
| 5,813,913 A | * | 9/1998 | Berner et al. | 463/40 X |
| 5,816,918 A | * | 10/1998 | Kelly et al. | 463/16 |
| 5,820,463 A | * | 10/1998 | O'Callaghan | 463/42 X |
| 5,917,725 A | * | 6/1999 | Tlatcher et al. | 364/410.1 X |
| 6,015,344 A | * | 1/2000 | Kelly et al. | 463/16 |
| 6,033,729 A | * | 2/2000 | Samuel et al. | 709/228 X |
| 6,106,395 A | * | 8/2000 | Begis | 463/23 |
| 6,117,011 A | * | 9/2000 | Lvov | 463/25 X |
| 6,128,660 A | * | 10/2000 | Grimm et al. | 709/227 X |
| 6,134,590 A | * | 10/2000 | Perlman | 709/228 |
| 6,152,824 A | * | 11/2000 | Rothschild et al. | 463/42 X |
| 6,159,014 A | * | 12/2000 | Jenkins et al. | 434/169 X |

FOREIGN PATENT DOCUMENTS

JP 1-157215 6/1989

* cited by examiner

Primary Examiner—Jessica Harrison
Assistant Examiner—Binh-An D. Nguyen
(74) Attorney, Agent, or Firm—Finnegan, Henderson, Farabow, Garrett & Dunner, L.L.P.

(57) ABSTRACT

The game system 1 comprises a plurality of game devices 2a, 2b, ..., a host computer 3 for implementing respective processing, and communication lines 4a, 4b, ..., 5a, 5b, ... to connect the game devices and the host information processing means. When there is a request for a game, the game device 2a is connected with the host computer 3 in order to provide such request to the host computer 3 and to receive opponent information from the host computer 3. Furthermore, the operation above is also implemented between the game device 2b and the host computer 3. After obtaining opponent information, the game devices 2a and 2b cut off the communication line 4a connected with the host computer 4, and a competition-type game is implemented between the game devices 2a and 2b by way of a communication line 5a.

9 Claims, 12 Drawing Sheets

FIG.8

| DIFFERENCE IN THE RANKINGS OF A PLAYER AND HIS OPPONENT | VICTORY | TIE | DEFEAT |
|---|---|---|---|
| 10 OR MORE | 1.00 | 0.00 | −1.00 |
| 8 | 1.20 | 0.20 | −0.80 |
| 6 | 1.40 | 0.40 | −0.60 |
| 4 | 1.60 | 0.60 | −0.40 |
| 2 | 1.80 | 0.80 | −0.20 |
| 0 | 2.00 | 1.00 | 0.00 |
| −2 | 2.20 | 1.20 | 0.20 |
| −4 | 2.40 | 1.40 | 0.40 |
| −6 | 2.60 | 1.60 | 0.60 |
| −8 | 2.80 | 1.80 | 0.80 |
| −10 | 3.00 | 2.00 | 1.00 |

| DIFFERENCE IN THE RANKINGS OF A PLAYER AND HIS OPPONENT | EVALUATION OF ONE GOAL |
|---|---|
| 10 OR MORE | 0.70 |
| 8 | 0.80 |
| 6 | 0.90 |
| 4 | 0.92 |
| 2 | 0.94 |
| 0 | 1.00 |
| −2 | 1.10 |
| −4 | 1.20 |
| −6 | 1.30 |
| −8 | 1.40 |
| −10 OR MORE | 1.50 |

GAME SYSTEM

BACKGROUND OF THE INVENTION

1. Field of the Invention

The present invention relates to a game system which allows competition-type games to be enjoyed by connecting respective game devices through a communication line under the control of host information processing means, and particularly to a game system which allows players to evaluate the results of a game more objectively.

More specifically, the present invention relates to a game system for playing various competition-type sports games such as soccer or baseball games by connecting respective game devices to each other through a communication line, wherein such game system expresses numerically the various conditions upon progressing a game, such as victories or defeats, scores, strategies, tactics, demonstration of performance by the characters, etc. of a game, and based on these values and schemes of data management period, etc., enables the objective evaluation of the results and the content of a game.

2. Related Art

Conventionally, there has been proposed a game system wherein game devices are connected to each other under the control of host information processing means (host computer) and competition-type games could be implemented.

A typical conventional game system of this type is structured by, for example, game device, a host computer, and a communication line connecting the game device and the host computer. In this game system, a request for an opponent player is made to the host computer from each game device via communication lines. Subsequently, on the basis of information obtained from the host computer, game devices are connected through communication lines, and a competition-type game is played between the players. After the game results are transmitted back to the host computer, the host computer transmits information on grades, ranking, etc. to each player.

However, the aforementioned game system has the following problems. As the first problem, the manner of evaluation is simple, and the game is therefore not amusing. In other words, since a typical conventional game system considers only the number of victories upon evaluating, the players, those who have experienced more games tend to be acknowledged as good players, making it disadvantageous for those who have had less games for different reasons and impairing the amusement of the game.

As the second problem, even when the terms of a game no longer conforms with the actual skill of a player, the player is forced to play the game under the initial terms, and the player's interest in the game is consequently reduced. For example, in actual soccer games, a certain team may suddenly demonstrate improved or degraded skills, and therefore, the development of the game would not be amusing unless such skills are reflected in the actual game device.

The present invention aims at providing a game system which may solve the aforementioned problems. Namely, it is an object of the present invention to provide a, game system whereby competition-type games may be played by having respective game devices connected through communication lines under the control of host information processing means, such that game results may be evaluated by the players in a more objective manner.

Moreover, another object of the present invention is to provide a game system which enables various terms of a game to always conform with the actual skill of the player. Namely, it is an object of the present invention to provide a game system capable of reflecting in the game device the conditions of a team demonstrating suddenly improved or degraded skills, for example, in the case of a soccer game, etc.

SUMMARY OF THE INVENTION

In order to accomplish the aforementioned objects, the present invention is a game system comprising a plurality of game devices, host information processing means for executing various processing, and communication lines connecting the game devices and the host information processing means, and when there is a request for a competition-type game, the game devices are connected to the host information processing means via communication lines so as to provide the information processing means with the request and to receive opponent information from the host information processing means, and the information processing means possesses information concerning the difference in the abilities of a player and his opponents and transmits such information to game devices of respective opponents in response to the request for a game from the game devices.

In the present invention, after the opponent information is received by the game devices, the game devices cut off communication lines with the host information processing, and the game devices are connected to each other via a communication line for playing a competition-type game.

Furthermore, according to the present invention, the host information processing means reads game results and evaluates the skill of each player operating respective game devices on the basis of the game results and information concerning the difference in the abilities of a player and the opponents.

Furthermore, according to the present invention, the host information processing means reads game results and evaluates skills of each player operating respective game devices on the basis of the game results and information concerning the difference in the abilities of a player and the opponents and a period for maintaining game results, laying more emphasis on games most recently played.

Furthermore, according to the present invention, the skill of a player is evaluated. by the host information processing means when a prescribed number of game results are obtained for each player.

Furthermore, according to the present invention, game data are made into a packet upon their delivery with a check sum attached thereto, and a packet of an opponent is calculated when received together with a check sum in order to compare the calculated check sum with the check sum being delivered, and when the check sums do not conform with one another a result of the comparison, a packet of the game data is delivered again together with a check sum.

Furthermore, according to the present invention, upon termination of a game with an opponent's game device, the game device maintains results of the game and delivers the game results to the host information processing means when making a request for a next game.

Furthermore, according to the present invention, the game device comprises at least a main body for processing various competition-type games and communication means for connecting a game device with the host processing means or a game device of an opponent via a communication line.

Furthermore, according to a further invention, the game device comprises a plurality of game devices, host information processing means executing various processing, and communication lines connecting the game devices and the host information processing means, and after obtaining opponent information from the host information processing means, the game devices may implement a competition-type game by being connected via a communication line, and game results are read by the host information processing means from the respective game devices so that abilities of each player operating respective time devices may be evaluated (in the basis of the game results and information concerning the difference in the abilities of a player and the opponents.

Furthermore, according to a further invention, skills of players operating respective game devices are evaluated by the host information processing means, laying more emphasis on games most recently played.

Furthermore, according to the respective inventions described above, a public network is used for the communication lines.

Furthermore, a recording medium according to the present invention stores a program for causing these game systems to operate. Recording medium here is a medium storing information, mainly digital data or programs recorded by some physical means, which allows computers or dedicated processors to perform desired functions. Accordingly, such medium realizes desired functions after it is downloaded to a computer by some means. Examples of such recording medium include flexible disk (FD), hard disk (HD), CD-ROM, CD-R, DVD-RUM, DVD-RAM, DVD-R, PD disk, MD disk, MO disk, etc. Furthermore, transmission of data from the host computer via wire or radio communication line (public line, dedicated line for data, satellite line, etc.) is also included. For example, transmission of data from a database of a server via internet is also included.

A terminal device according to the present invention may be used in the game systems above.

DESCRIPTION OF THE DRAWINGS

FIG. 8 is an explanatory diagram showing a victory point evaluation table used in the aforementioned game system.

FIG. 9 is an explanatory diagram showing a goal point evaluation table used in the aforementioned game system.

PREFERRED EMBODIMENTS

A preferred embodiment of the present invention will be explained below with reference to FIGS. 1 through 8.

Figure 1:
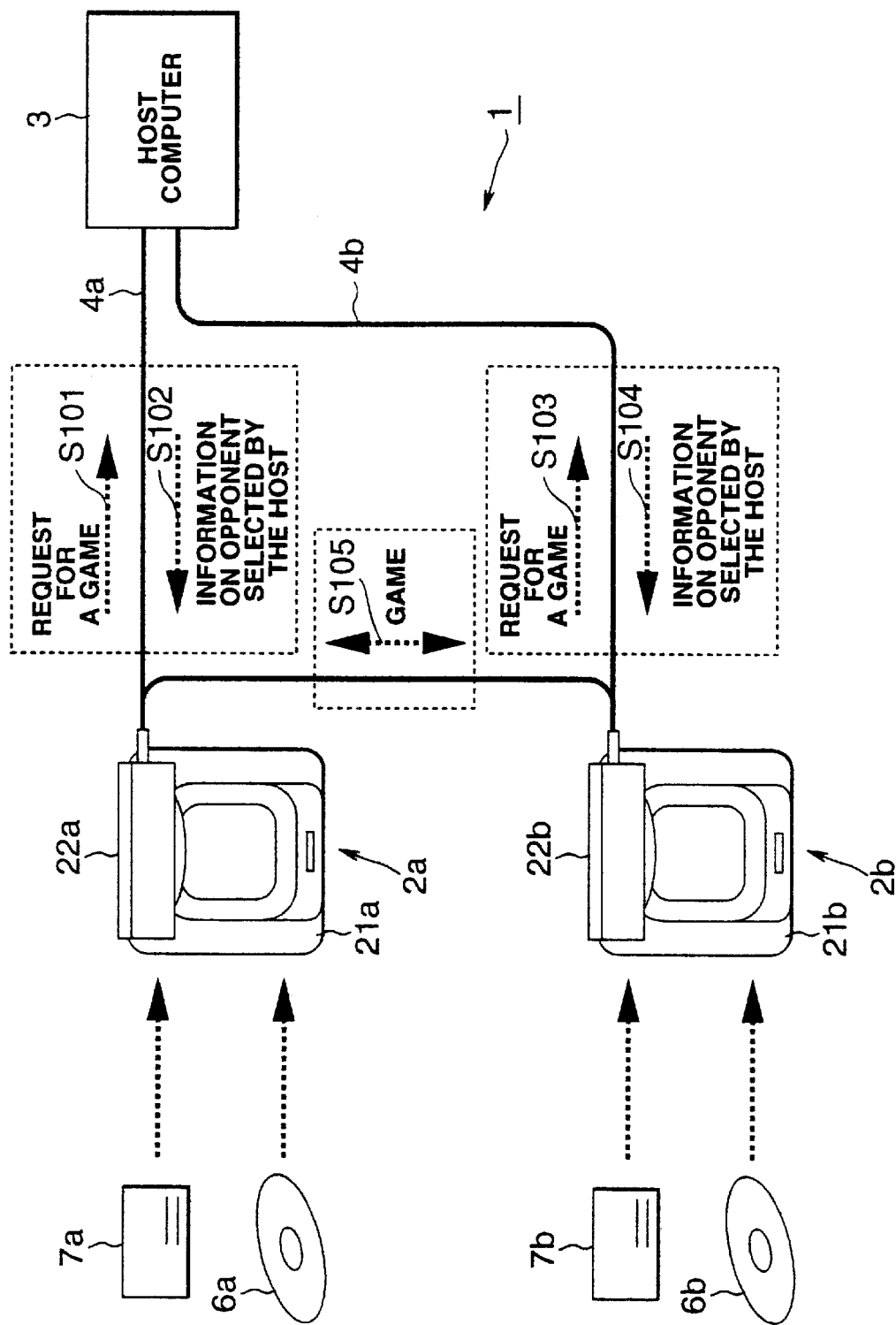
FIG. 1 is a block diagram showing the configuration of the game system according to the first embodiment.

FIG. 1 is a block diagram showing a structure of the game system according to the present invention. In FIG. 1, a game system 1 comprises: game devices 2a, 2b, . . . ; host information processing means (host computer) 3; communication lines 4a, 4b, . . . for connecting the game devices 2a, 2b, . . . to host information processing means (host computer) 3; and communication lines 5a, 5b, . . . for mutually connecting the game devices 2a, 2b, . . . . The communication lines 4a, 4b, . . . and the communication lines 5a, 5b, . . . do not imply that different communication lines are being laid, but simply show that different players are being connected.

The game device 2a comprises: a main body 21a; a modem 22a which connects the main body 21a to a communication line 4a; a peripheral (not shown in FIG. 1) such as a pad for operating the game device which is connected with the main body 21a; and a TV receiver. The main body 21a is configured so that a CD-ROM 6a recording game software for a competition-type game may be installed thereon. The modem 22a is configured to read a prepaid card 7a for the modem.

Since the game devices 2b, . . . are devised to have exactly the same configuration as the game device 2a above, explanations of their configuration will be omitted, and a mark ". . . " will be simply added to the reference numeral having an identical configuration.

Figure 2:
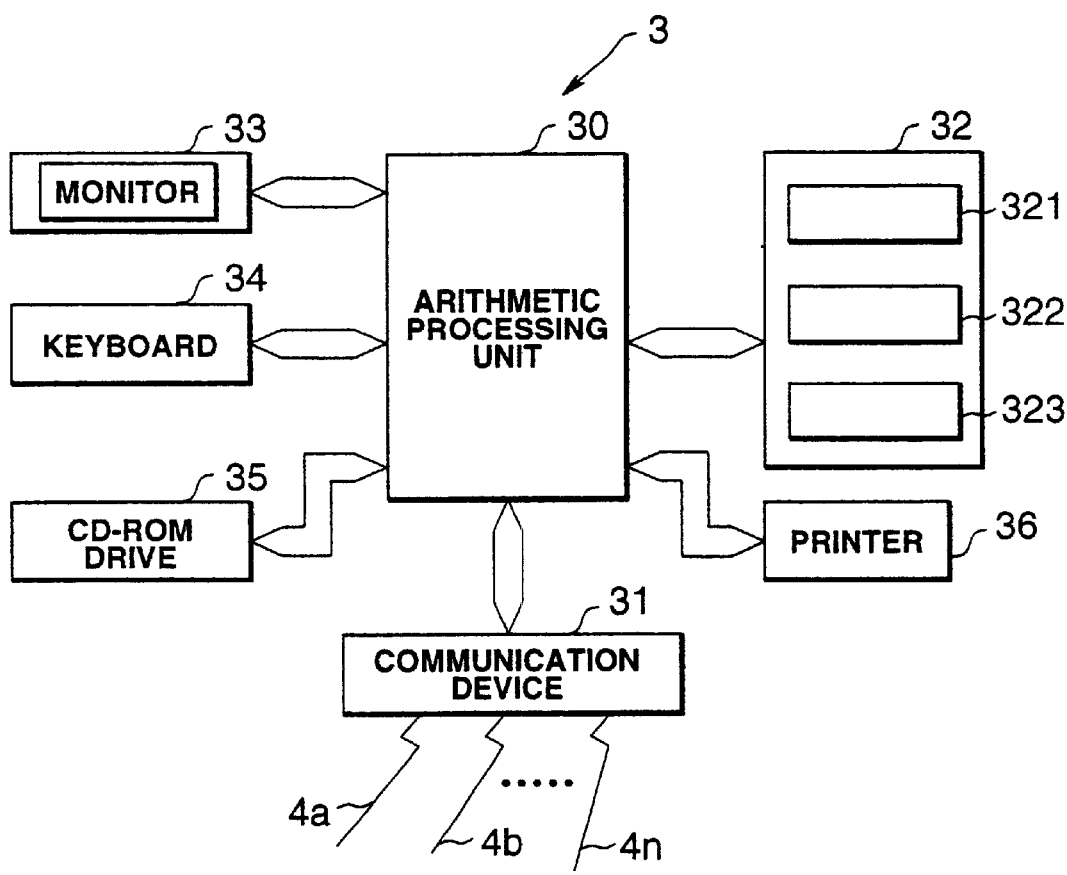
FIG. 2 is a block diagram showing the configuration of the host computer of the aforementioned game system.

FIG. 2 is a block diagram showing the configuration of a host computer 3. In FIG. 2, the host computer comprises: a large-size arithmetic processing unit 30; a communication device 31 connected with the arithmetic processing unit 30; an external memory 32 storing various data and programs; a monitor 33; a keyboard 34; a CD-ROM drive 35; and a printer 36.

Although not indicated in FIG. 2, the arithmetic processing unit 30 comprises an MPU, a main memory, a read-only memory, a control unit, an input/output unit and other circuits.

Communication lines 4a, 4b, . . . , 4n (n may be any number) are connected with the communication device 31.

As the external memory 32, a large-size hard disc device and other memories can be used. The external memory 32 stores a victory point evaluation table 321, a goal point evaluation table 322 and a data base 323 of other information.

Figure 3:
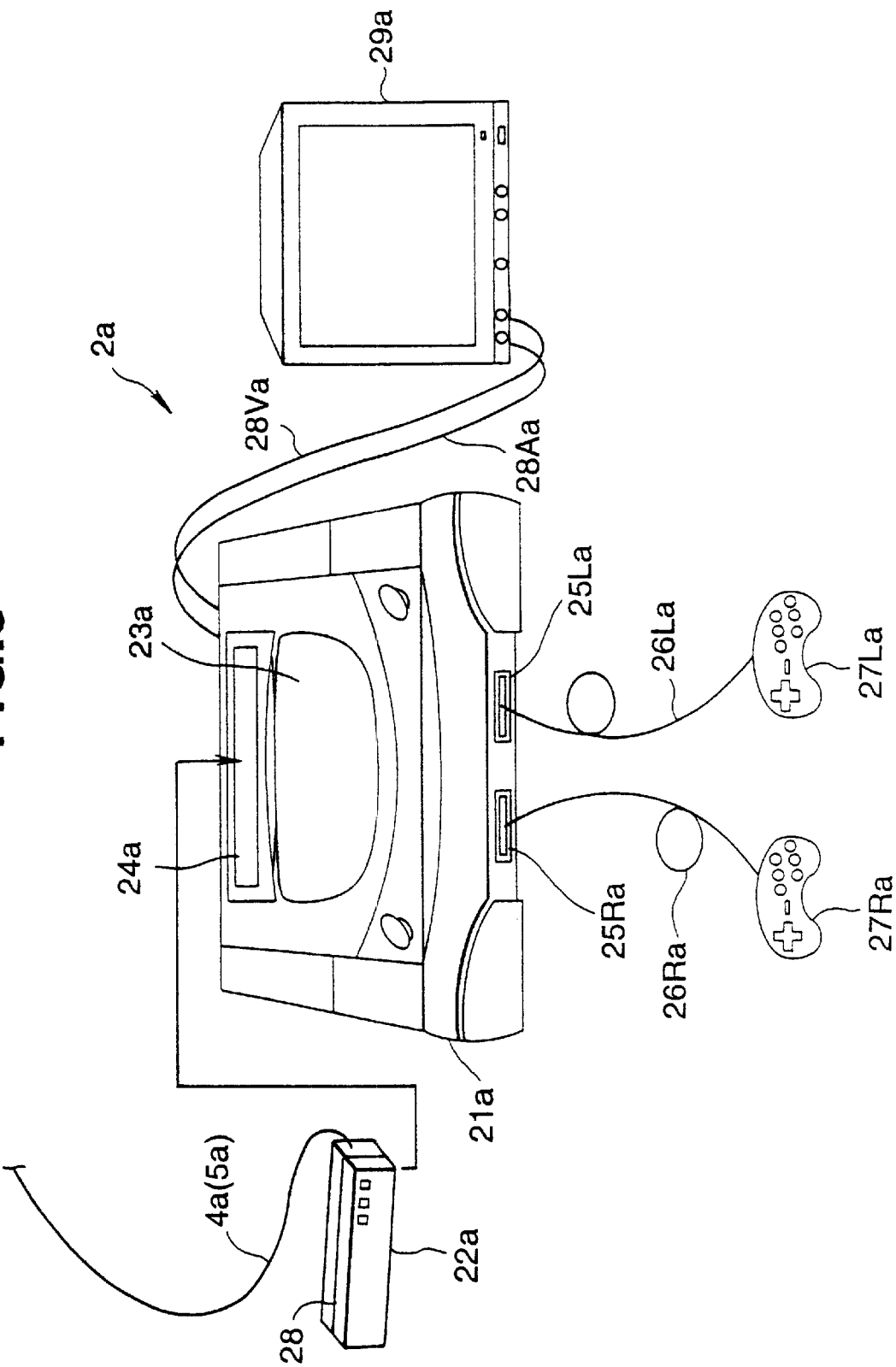
FIG. 3 is a perspective view showing the external appearance of a game device in the aforementioned game system.

FIG. 3 is a perspective view mainly showing the external appearance of the game device. According to FIG. 3, the game device 2a has the following principal components: the main body 21a of the TV game device, the communication means (modem) 22a, peripherals 27Ra and 27La, and a TV receiver 29a such as PADs.

On top of the main body 21a, there is provided a cartridge I/F 24a for ROM cartridge connection. Furthermore, on top of the main body 21a, a CD-ROM drive 23a for reading out a CDROM is also provided.

On the front face of the game main body 21a, there are provided two connectors 25Ra and 25La, to which peripherals 27Ra and 27La such as PADs for operating the game device are connected via cables 26Ra and 26La.

Although not shorten in FIG. 3, on the back face of the game main body 21a, there are provided a video output terminal and an audio output terminal. The video output terminal is connected with a video input terminal of the TV receiver 29 via a cable 27Va. The audio output terminal is connected with the audio input terminal of the TV receiver 29 via a cable 28Aa.

Moreover, the modem 22a may be connected with the main body 21 by being plugged into the cartridge I/F 24a. The modem 22a comprises a card reader 20a for reading the prepaid card 7a for the modem.

Using the game device having the aforementioned configuration, the player may implement a game by operating the peripherals 27Ra and 27La while watching a screen displayed on the TV receiver 29 and.

Figure 4:
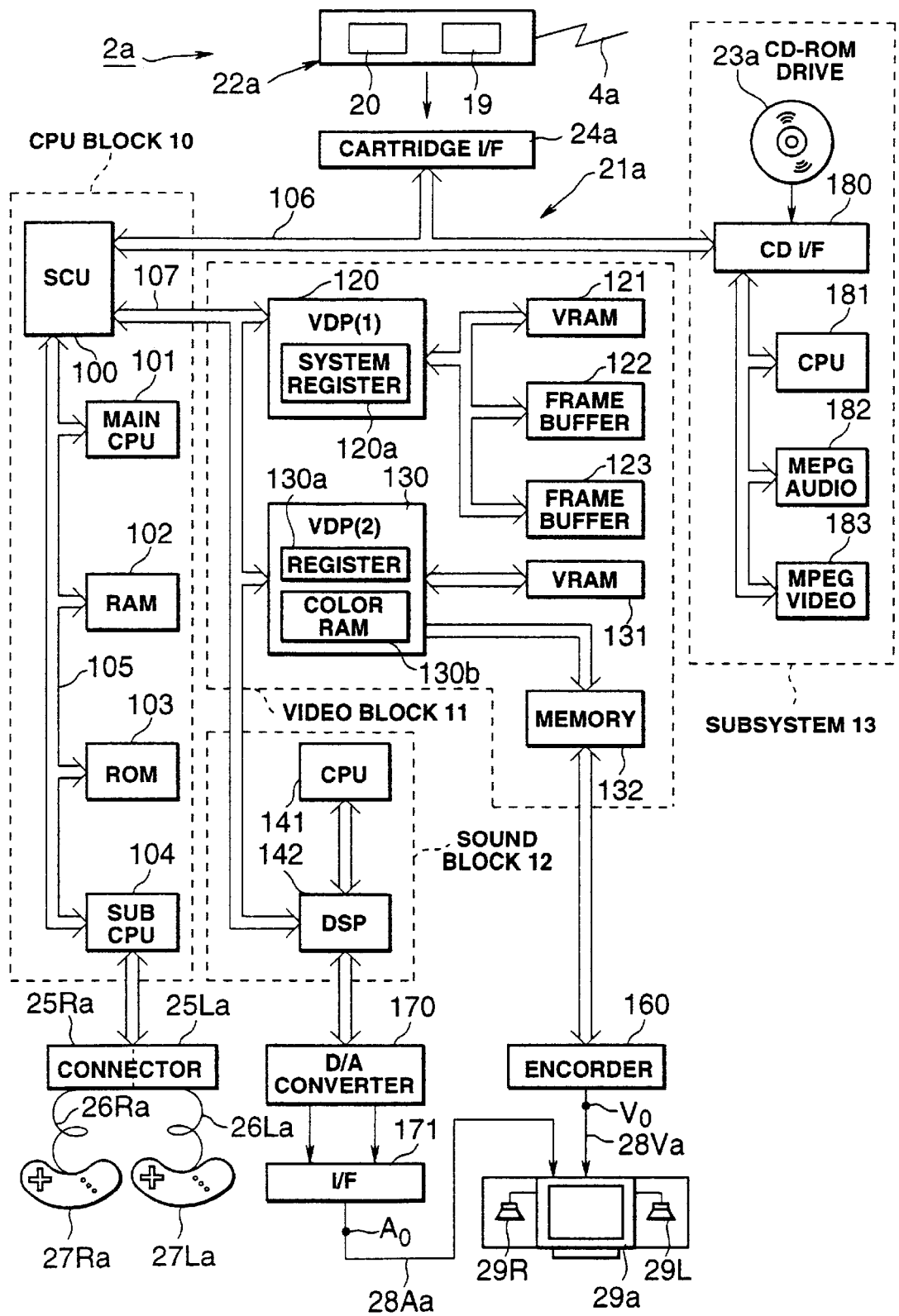
FIG. 4 is a block diagram showing the outline of the main body of the TV game device in the aforementioned game system.

FIG. 4 is a block diagram outlining mainly the main body of the TV game device. The main body 21a comprises a CPU block 10 for controlling the overall device, a video block 11 for controlling the display of the game screen, a sound block 12 for producing sound effects, a subsystem 13 for reading out the CD-ROM, etc.

The CPU block 10 comprises a SCU (System Control Unit) 100, main CPU 101, a RAM 102, a ROM 103, a cartridge I/F 24a, a sub CPU 104, a CPU bus 105, etc. The main CPU 101 controls the overall game device. The main CPU 101 internally comprises a computing function similar to DSP (Digital Signal Processor) and allows high-speed execution off application software.

The RAM 102 is used as the work area of the main CPU 101. An initial program etc. for initializing processing and other programs are written in the ROM 103. The SCU 100 enables smooth input and output of data among the main CPU 101, VDPs 120, 130, DSP140, etc.

Furthermore, the SCU 100 comprises a DMA controller inside, and is capable of transferring game character data (polygon data) to the VRAM 121 in the video block 11. As a consequence, application software of game devices etc. may be executed at a high speed. A cartridge I/F 1a is for inputting application software provided in the form of a ROM cartridge to the prescribed block in the main body of the TV game device.

The sub CPU 104 is called the, "SMPC" (System Manager & Peripheral Control), and comprises functions such as collecting peripheral data from the peripherals 27Ra and 27La via connectors 25Ra and 25La shown in FIG. 3.

On the basis of peripheral data received from the sub CPU 104, the main CPU 101 controls images and implements processing such as rotational transform processing and perspective transform processing of a character (of coordinates, etc.) shown in the virtual space (three-dimensional space), and thereafter implements processing for displaying such images on the screen. Peripherals can be selected out of pads, joy sticks, keyboards, etc. so as to be connected with the connectors 25Ra and 25La. The sub CPU 104 has a function of automatically recognizing the type of peripheral connected with the connectors 25Ra and 25La and collecting peripheral data in accordance with the communication regulations depending on the type of peripheral.

The video block 11 comprises a first VDP (Video Display Processor) 120 for drawing polygon screen over a character image and a background image consisting of polygon data of the TV game. The video block 11 also comprises a second VDP 130 for drawing a scroll background image, synthesizing polygon image data and scroll image data in accordance with priorities (display priorities), and also implementing clipping processing.

The first VDP 120 internally comprises in a system register 120a and is connected with a VRAM (DRAM) 121 and double-plane frame buffers 122 and 123. Polygon drawing data, representing TV game characters are sent to the first VDP 120 via the main CPU 101. The drawing data written in the VRAM 121 are drawn on the frame buffer 122 (or 123) in the form of, for example, 16 or 8 bit/pixel. The data drawn on the frame buffer 122 (or 123) are sent to the second VDP 130 during a display mode.

Thus, buffers 122 and 123 are used as frame buffers, thereby constituting a double-buffer structure for switching drawing and display modes with respect to each frame. Furthermore, information for controlling the drawing processing is delivered from the main CPU 101 via the SCU 100, so that the first VDP 120 may control drawing and display according to the instructions which are set in the system register 120a of the VDP120.

On the other hand, the second VDP 130 having a register 130a and a color RAM 130b built therein is connected with a VRAM 131. Furthermore, the second VDP 130 is connected with the first VDP 120 and the SCU 100 via a bus 107, and also with a video output terminal Vo via a memory 132 and an encoder 160. A video input terminal of the TV receiver 5 is connected with the video output terminal Vo via a cable 4.

With respect to this second VDP 130, scroll screen data are defined in the VRAM 131 and the color RAM 130b via the main CPU 101 and the SCU 100. Similarly, information for controlling image display is also defined in the second VDP 130. Data defined in the VRAM 131 are read out in accordance with the content being set in the register 130a by the second VDP 130 so as to become the image data for respective scroll screens representing background images in respect to the character. According to priorities of display determined in conformity with the terms set in the register 130a, image data for each scroll screen are synthesized with polygon image data delivered from the first VDP 120 having texture mapping processed hereon, and thereby form final display image data.

If these display image data are in a pallet form, color data defined in the color RAM 130b will be read out in conformity with the values of such data so that display color data will be produced. Furthermore, if the display image data are in a RGB form, they will constitute display color data without any further processing. The display color data are output to the encoder 160 after being accumulated in the memory 132. By adding synchronous signals etc. to such image data, the encoder 160 produces image signals and provides such signals to the video input terminal of the TV receiver 29 via the video output terminal Vo and a cable 28Va.

The sound block 12 comprises a DSP 140 for implementing voice synthesis according to the PCM or the FM method, as well as a CPU 141 for controlling the DSP 140. Voice data produced by the DSP 140 are converted to 2-channel voice signals by a D/A converter 170 and are subsequently provided to an audio output terminal Ao via an interface 171. The audio output terminal Ao is connected with the audio input terminal of the TV receiver 5 via the cable 28Aa. Therefore, voice signals are input to the audio amplifying circuit (not shown in FIG. 4) via the audio output terminal Ao and the cable 28Aa. Speakers 29R and 29L built in the TV receiver 29 are driven by the sound signals amplified at the audio amplifying circuit.

The subsystem 13 is structured by a CD-ROM drive 1b, a CD-I/F 180, a CPU 181, an MPEG-AUDIO unit 182, an MPEG-VIDEO unit 183, etc. The subsystem 13 comprises a function such as reading application software provided in the form of a CD-ROM and reproducing motion pictures.

The CD-RO drive 1b reads data from a CD-ROM. The CPU 181 implements processing such as controlling the CD-ROM drive 1b and correcting false data which are read out. The data read out from the CD-ROM are provided to the main CPU 101 via the CD-I/F 180, a bus 106 and the SCU 100 for use as application software.

The MPEG-AUDIO unit 182 and the MPEG-VIDEO unit 183 are devices for restoring data compressed in accordance with the MPEG (Motion Picture Expert Group) standard. Using the MPEG-AUDIO unit 182 and the MPEG-VIDEO unit 183, motion pictures may be reproduced by restoring the MPEG compressed data written in the CD-ROM.

By inserting the modem 22a in the cartridge I/F 24a, communication between the modem processing circuit 19a of the modem 22a and the main CPU 101 is made possible. The main body 21a of the game device 2a can be connected with the host computer 3 via the communication circuit 4a, or with other game devices 2b, . . . via the communication circuit 5a. A Prepaid card reader 20a is connected with the modem processing circuit 19a of the modem 22a so that fees necessary for the communication are paid with the prepaid card 6a. In other words, the modem processing circuit 19a of the modem 22a has a slot for inserting small cards relying on ISO7816. The modem processing circuit 19a comprises a memory for keeping personal information of the players, system patches, and results of previous games.

[Operation of the Game System]

Figure 5:
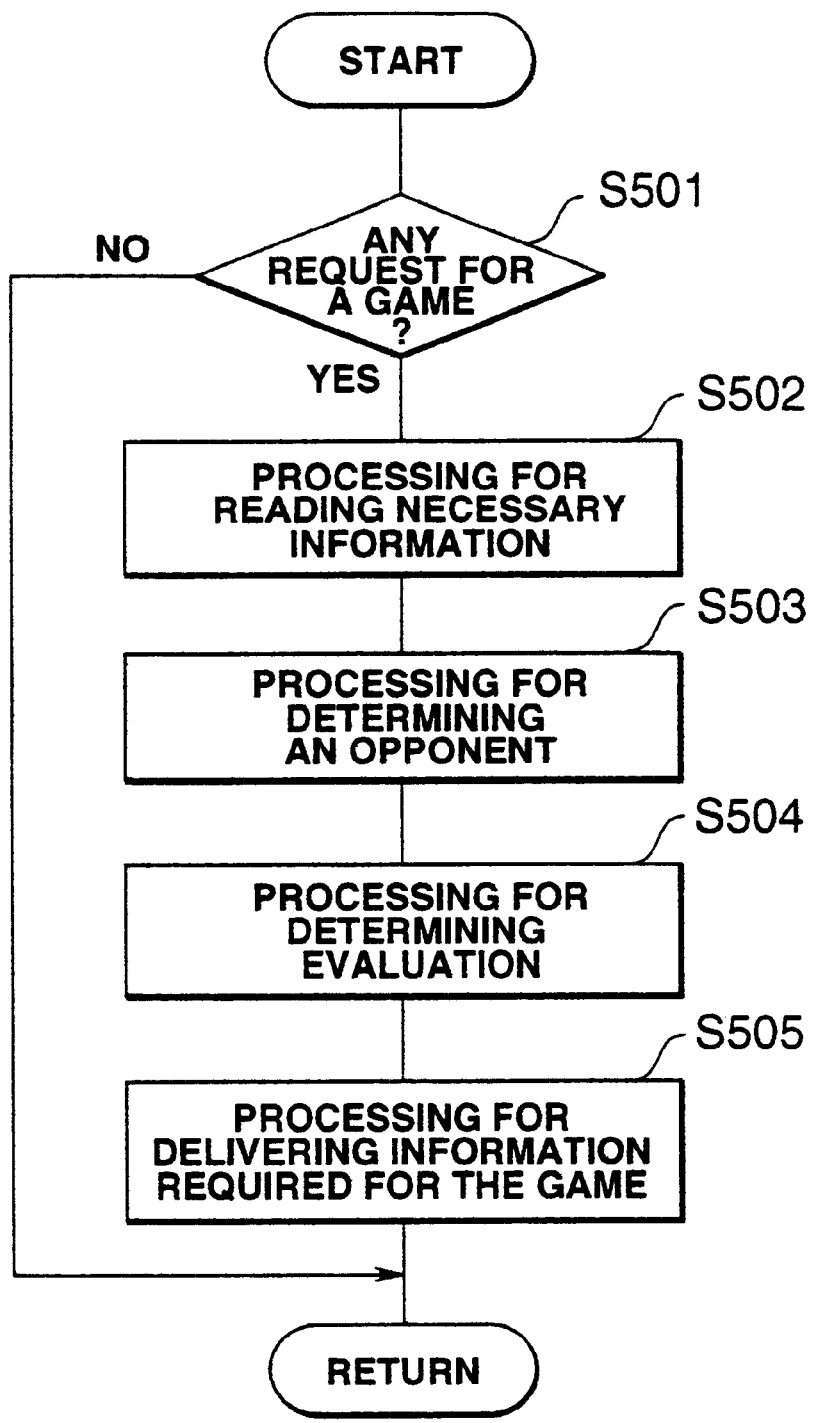
FIG. 5 is a flowchart explaining the operation of the host computer of the aforementioned game system.
Figure 6:
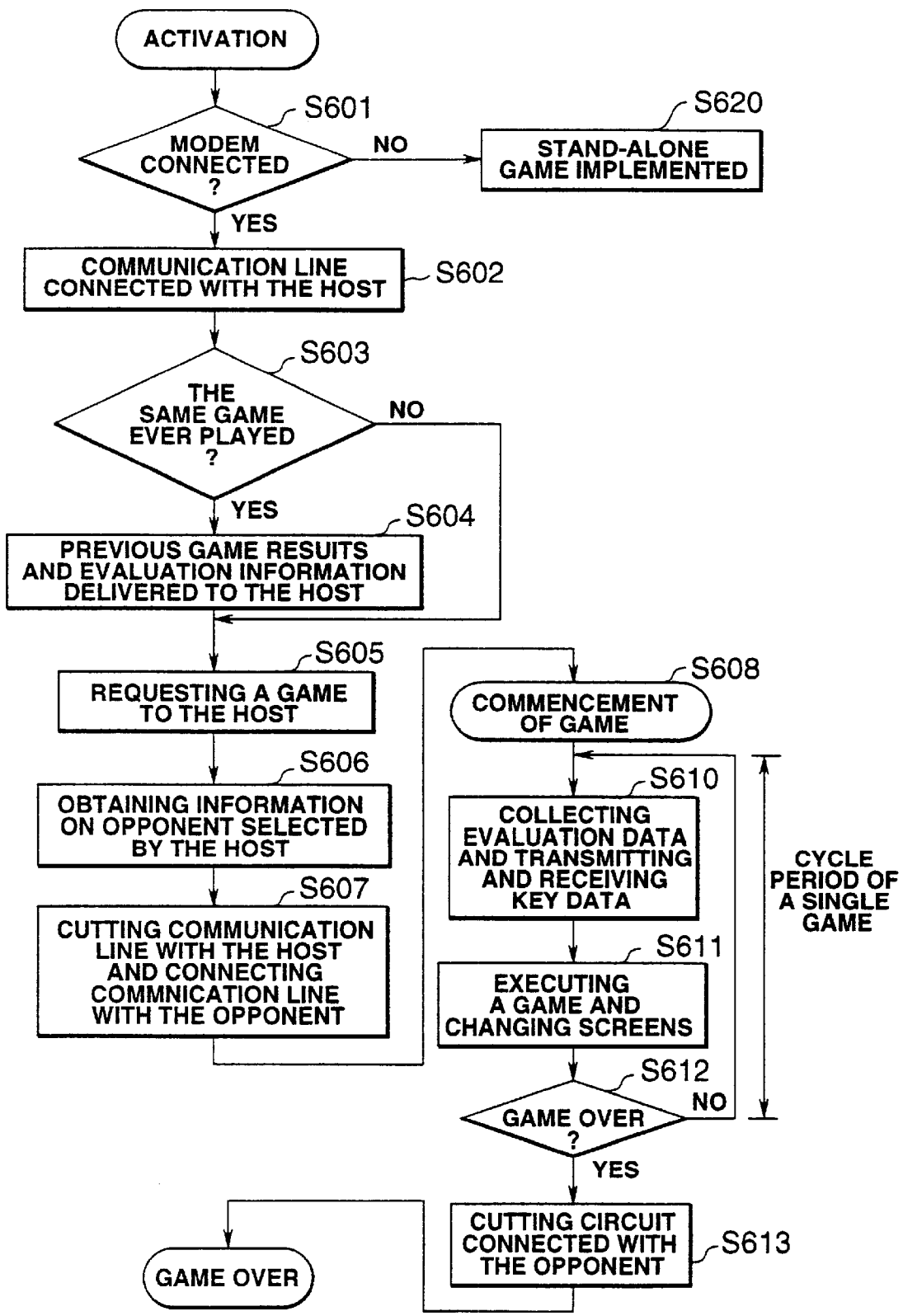
FIG. 6 is a flowchart explaining the operation of the main body of the game device in the aforementioned game system.
Figure 7:
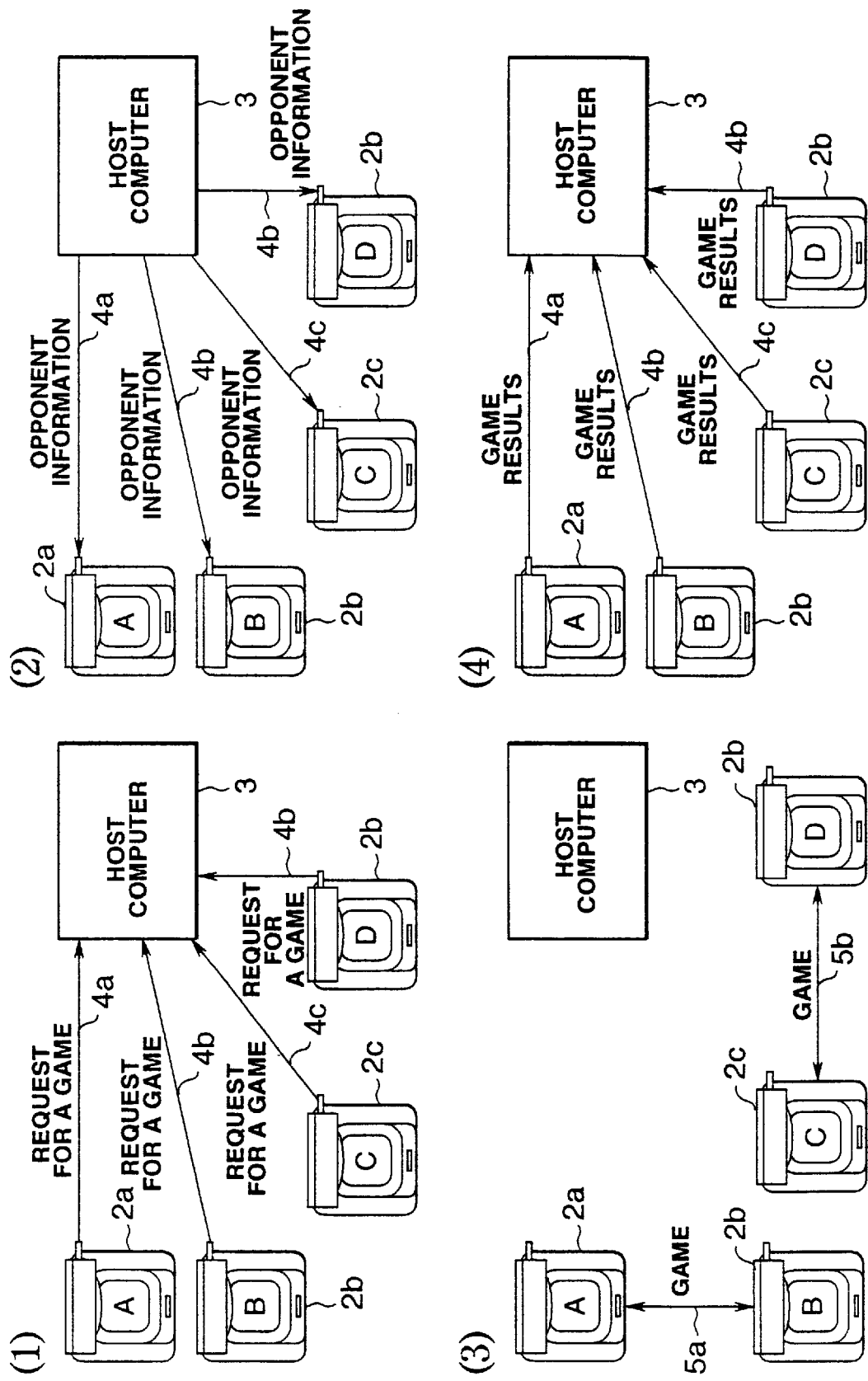
FIG. 7 is an explanatory diagram showing the outline of the overall operation of the aforementioned game system.

The operation of the game system will be explained below, based on FIGS. 1 through 4, referring to FIGS. 5 through 9. FIG. 5 is a flowchart illustrating the operation of the host computer. FIG. 6 is a flowchart showing the operation of the main body of the game device. FIG. 7 is an explanatory diagram showing the outline of the overall operation of the game system. FIG. 8 is an explanatory diagram showing the victory point evaluation table used in the game system. FIG. 9 is an explanatory diagram showing the goal point evaluation table used in the game system.

The external memory 32 of the host computer 3 stores, for example, the victory point evaluation table 321 shown in FIG. 8, as well as the goal point evaluation table 322 shown in FIG. 9. As shown in the victory point evaluation table 321 of FIG. 8, difference in the rankings of a player and his opponent is divided into [−10~+10] grades. Depending on the divided ranking, a victory in a game is evaluated as [3.00~1.00] point(s), while a tie in a game is evaluated as [2.00~0.00] point(s) and a defeat in a game as [1.00~1.00] point(s). Furthermore, as shown in the goal point evaluation table 322 of FIG. 9, difference in the rankings of a player and his opponent is divided into [−10~+10] grades, and the evaluation of a single goal is divided into [1.50~0.70] point(s).

Furthermore, on the basis of application software provided from a cartridge or CD-ROM acting as a medium, which is set either the cartridge I/F 24a or the CD-ROM drive 23a, the main CPU 101 in the main body 21a of the game device 2a implements operations for selecting the screen type and progressing the game. Furthermore when a cartridge is installed to the cartridge I/F 24a on the main body 21a, or when the modem 22 is not being installed, an independent game not in the form of a competition will be processed.

Since main bodies 21b, 21c. . . of the game devices 2b and 2c operate in the same manner as the main body 21a of the game device 2a, explanation of their operations will be omitted unless required.

After each prescribed period of time, the arithmetic processing unit 30 of the host computer 3 implements processing as shown in the flowchart of FIG. 5. First of all, the arithmetic processing unit 30 determines whether or not a request for a game has been made by any player (S501). When no such request is identified (S501; NO), the arithmetic processing unit 30 moves out of the processing and shifts to another processing, returning to this processing of this flowchart after a prescribed period of time. Such prescribed period of time being very short, processing of other game devices 2b, 2c, . . . will also be conducted instantly.

When a request for a game is identified (S501; YES), the arithmetic processing unit 30 reads out from the main body 21a information necessary for processing the game (S502 of FIG. 5). This is the where the main body 21a sends the aforementioned request for a game to the host computer 3 by way of the modem 22—the communication line 4a, as shown in step S101 in FIG. 1.

Furthermore, the host computer 3 executes an opponent determination processing (S503 of FIG. 5). In this processing, if no opponent is available, the processing terminates after forming information for the player to wait for an opponent since no opponent is available. On the other hand, if any opponents are available, an opponent for a game will be determined.

Moreover, the arithmetic processing unit 30 of the host computer 3 executes a processing for deciding the evaluation of the player who is operating the main body 21a (S504 of FIG. 5). The arithmetic processing unit 30 makes no evaluation unless a prescribed number of game results are available. When the arithmetic processing unit 30 determines that a prescribed number of game results are available, the skill of a player is evaluated according to the difference in the rankings of the player and his opponent, referring to the victory point evaluation table 321 shown in FIG. 8 and the goal point evaluation table 322 shown in FIG. 9. Suppose that the ranking of a player differs from that of his opponent by 2 grades, then a victory in a game will be evaluated as [1.8] point, while a tie in a game will be evaluated as [0.81] point, and a defeat in a game as [−0.2] point. Accordingly, this evaluation is stored, for example, in the main memory, etc. of the arithmetic processing unit 30.

Subsequently, the opponent information, evaluation of a game, the rankings of the players, and other information necessary for the promotion of the game are provided to the main body 21a by arithmetic processing unit 30 by way of the communication device 31, the communication line 4a, and the modem 22a (S101 of FIG. 1, S505 of FIG. 5).

On the other hand, processing shown in the flowchart of FIG. 5 is implemented by the arithmetic processing unit 30 (S501 through S505) also to the game device 26. Here, a request for a game is made to the host computer 3 (S103 of FIG. 1), and various information necessary for executing the game is respectively read from the host computer 3 (S104 of FIG. 1).

As a result of the arithmetic processing unit 30 of the host computer 3 implementing the processing shown in the flowchart of FIG. 5 to the main bodies 21c, 21d . . . of other game devices, requests for games made from the main bodies 21a, 21b are delivered to the host computer 3, as shown in FIG. 7 (1).

Thereafter, information necessary for processing a game is delivered to the main bodies 21a, 21b, . . . by the arithmetic processing unit 30 of the host computer 3.

Subsequently, the main bodies 21a and 21b are connected to each other (see S105 of FIG. 1 and (3) of FIG. 7), and the main bodies 21c and 21d are connected to each other (see (3) of FIG. 7), whereby games are respectively progressed between the opponents. In the meantime, none of the main bodies 21a, 21b, . . . are not connected with the host computer 3.

The operation of the main body 21a of the game device will be now explained. When the power of the main body 21a is switched on, the main CPU 101 determines whether or not the modem 22a is connected with the cartridge I/F 24a (S601). When the CPU 101 determines that the modem 22a is not connected with the cartridge I/F 24a (S601; NO), the main CPU 101 implements the following processing on the assumption that a stand-alone game would be played by the player (S620).

On the other hand, when the CPU 101 determines that the modem 22a is connected with the cartridge I/F 24a (S601; YES), the main CPU makes contact with the host computer 3 via the communication line 4a on the basis of the game software set to the CD-ROM drive 23a (S602 of FIG. 6).

Thereafter, the main CPU 101 determines whether or not a competition-type game has been processed theretofore (S603 of FIG. 6), and when a previous processing is identified (S603; YES), the main CPU-101 delivers the result of the processed game to the host computer 3 and shifts to the next processing (S604 of FIG. 6). On the other hand, when no previous processing is identified (S603; NO), the main CPU 101 shifts to the next processing without any processing.

Subsequently, the main CPU 101 delivers a request for a game to the host computer 3 (S605 of FIG. 6, S101 of FIG. 1).

The main CPU 101 obtains opponent information together with other information (S605). Such information is stored in the modem 22a and the RAM, etc. of the main body 21a.

Then, on the basis of the information stored, the modem 22 is activated by the main CPU 101 so that the game device 2a is connected with the game device 2b via the communication line 5a (S607). Namely, the game device 2a is connected with the game device 22 by way of the modem 22a—the communication line 5a—the modem 22a. As a consequence, the game device 2a synchronizes with the connected game device 2b, and a game is commenced.

First of all, the main CPU 101 of the main body 21a collects evaluation information, and further transmits and receives data on the peripherals 27Ra and 27La together with other information (S610).

The main CPU 101 of the main body 21a executes the game, renews the screen and forms sounds (S611 of FIG. 6). Furthermore, the main CPU 101 determines whether or not the game has been finished (S612 of FIG. 6). When the main CPU 101 determines that the game has not been finished (S612 of FIG. 6; NO), the main CPU 101 repeats a series of processing from the step S610 (S610, S611, S612 of FIG. 6; NO).

When the main CPU 101 determines that the game has been finished (S612; YES), the main CPU 101 of the game device 21a cuts off the communication line 5a connected with. the opponent's game device 2b and thereby terminates the game.

The above-described processing shown in the flowchart of FIG. 6 is implemented in other game devices 2b, 2c, . . . . As a result, the processing of (1) through (3) shown in FIG. 7 is implemented between the respective game devices 2a, 2b, and the host computer 3.

As shown in (4) of FIG. 7, results of the games between the game devices 2a and 2b, and the game between the game devices 2c and 2d are delivered to the host computer 3 after the termination thereof, when each of the game devices 2a, 2b, . . . , etc. are next connected with the host computer 3 (S604 of FIG. 6).

Evaluation processing (S503 of FIG. 5) by the host computer 3 will be explained below in further detail.

Due to the steps S602 through S605 in FIG. 6A being implemented by the game devices 2a, 2b, . . . , the results of the games delivered from the game devices 2a, 2b, . . . are read by the arithmetic processing unit 30 of the host computer 3 (S502). Similarly, player information and other information are read by the arithmetic processing unit 30.

The arithmetic processing unit 30 implements processing as follows. If, for example, in a soccer game, pursuant to the player information, information necessary for processing the game, and game results read in the manner above, there is provided information that the rankings of the players considered upon evaluation of a goal point differ by [6] grades and also information that one goal has been made according to the game results, then such one goal. will be evaluated as [0.9] point.

Furthermore, if a player using, for example, the game device 21a is defeated in a game, and the arithmetic processing unit 30 has information that the rankings of the players considered upon evaluation of a goal point differ by [8] grades, then a defeat known from the game results information would be evaluated as [−0.8] point.

Thus, pursuant to the results of the games played between the players, the host computer 3 numerically evaluates the objective difference in the players skills, by referring to the characters or teams used by the players, as well as values representing the skills of both teams. Thereafter, the host computer delivers the results of its evaluation to the game devices 2a, 2b, . . . .

Furthermore, the host computer 3 may also determine default rankings of the teams and modify such ranking by adding up each player's victory and defeat recorded in a series of games.

Moreover, although teams and characters differing in strength by default are required for the victory point evaluation table 321 and the goal point evaluation table 322, etc., in order to ensure fair ranking of the players, higher points are set for weak teams or characters in the scoring items such as the victory point evaluation table 321 or the goal point evaluation table 322, as compared with strong teams or characters. Pursuant to the values being set, objective evaluation is made by the arithmetic processing unit 30. Namely, in the embodiment above, if a competition-type sports game such as a soccer game or a baseball game is played between the game devices 2a and 2b which are connected to each other via the communication wire 5a, various conditions for progressing the game, for example, a victory or a defeat in a game, scores, strategies, tactics, degree which the characters demonstrate their performances, etc. are expressed numerically, whereby the content of a game is evaluated in an objective manner.

In addition, since evaluation by the arithmetic processing unit 30 is made only after a prescribed number of victories and defeats are recorded for a relevant player, processing for evaluation is implemented according to the results of a prescribed number of games (four games, for example).

Furthermore, the arithmetic processing unit 30 determines a prescribed period of time, and implements processing for determining the ranking of the players within such period of time, laying more emphasis on the latest data.

In the case of a competition-type game, conventionally, it was required of respective game devices to be always connected with the host computer. Whereas, according to the present embodiment, when opponent information is provided from the host computer 3 to the game devices 2a, 2b, . . . , appointed game devices are connected to each other, for example, the game devices 2a and 2b via the communication line 5a, and the game devices 2c and 2d via the communication line 5b. Thereafter, competition-type games are respectively played between the game devices 2a and 2b, and the game devices 2c and 2d, and victories or defeats in the games are subsequently stored in each of the game devices 2a, 2b, . . . .

When game data are exchanged between the game devices 2a and 2b or the game devices 2c and 2d, the data are collected into a unit of a packet with a check sum attached thereto so that the packet and the check sum may be transmitted and received. After a packet and a check sum are received by the game devices 2a, 2b, . . . , the received check sum is calculated so that it may be compared with the check sum which has been delivered with the packet. If the check sums do not conform with each other, the game data is delivered again in the form of a packet with a check sum attached thereto.

Therefore, game data are communicated between the game devices 2a and 2b in a highly reliable manner.

In the present embodiment, since the victory point evaluation table 321, the goal number evaluation table 322 and data base 323 of other information are stored in the host computer 3, by using the tables and the data base and implementing various data management processing in accordance with the game results of each player, the skills of the players can be evaluated more objectively.

Furthermore, according to the present embodiment, by devising the period and the manner of data management, the skills of the players can be evaluated more objectively. For example, new players may be evaluated after a prescribed number of games. In addition, there will be no disadvantage among the players depending on the number of games previously played.

Moreover, according to the present embodiment, evaluated value may be modified if there is any change in the skill of an actual team. Accordingly, the player will always feel that the game conforms with his current skill and the amusement of the game is thereby enhanced.

Although an example of a soccer game is given in the explanation of the embodiment above, the present invention is not limited to soccer games, but may be applied to other sports and matches of martial arts and other competition-type games.

Moreover, in a further embodiment of the present invention, programs for activating the game device 2a, 2b, . . . of the game system 1 and the host computer 3 (see, for example, flowcharts of FIGS. 5 and 6) are stored in the storage medium. For such storage medium, a floppy disc, a hard disk, a magnetic tape, an optical magnetic disk, a CD-ROM, a DVD, a ROM cartridge, a RAM memory card with battery backup, a flash memory cartridge, non-volatile RAM cartridge, etc. and other memory media may be used.

Second Embodiment

A second embodiment of the present invention will be explained below with reference to FIGS. 1 through 12. According to the second embodiment, when a competition-type telecommunication game is to be played, the game devices are directly connected to each other via the host computer and the game is thus executed. The second embodiment differs from the first embodiment in this respect. Features of the second embodiment differing from the first embodiment will be mainly explained below. Unless specifically mentioned, the controlling processing (evaluation according to the victory point evaluation table, and telecommunication control, etc.) for executing the game in the second embodiment is the same as in the first embodiment.

Figure 10:
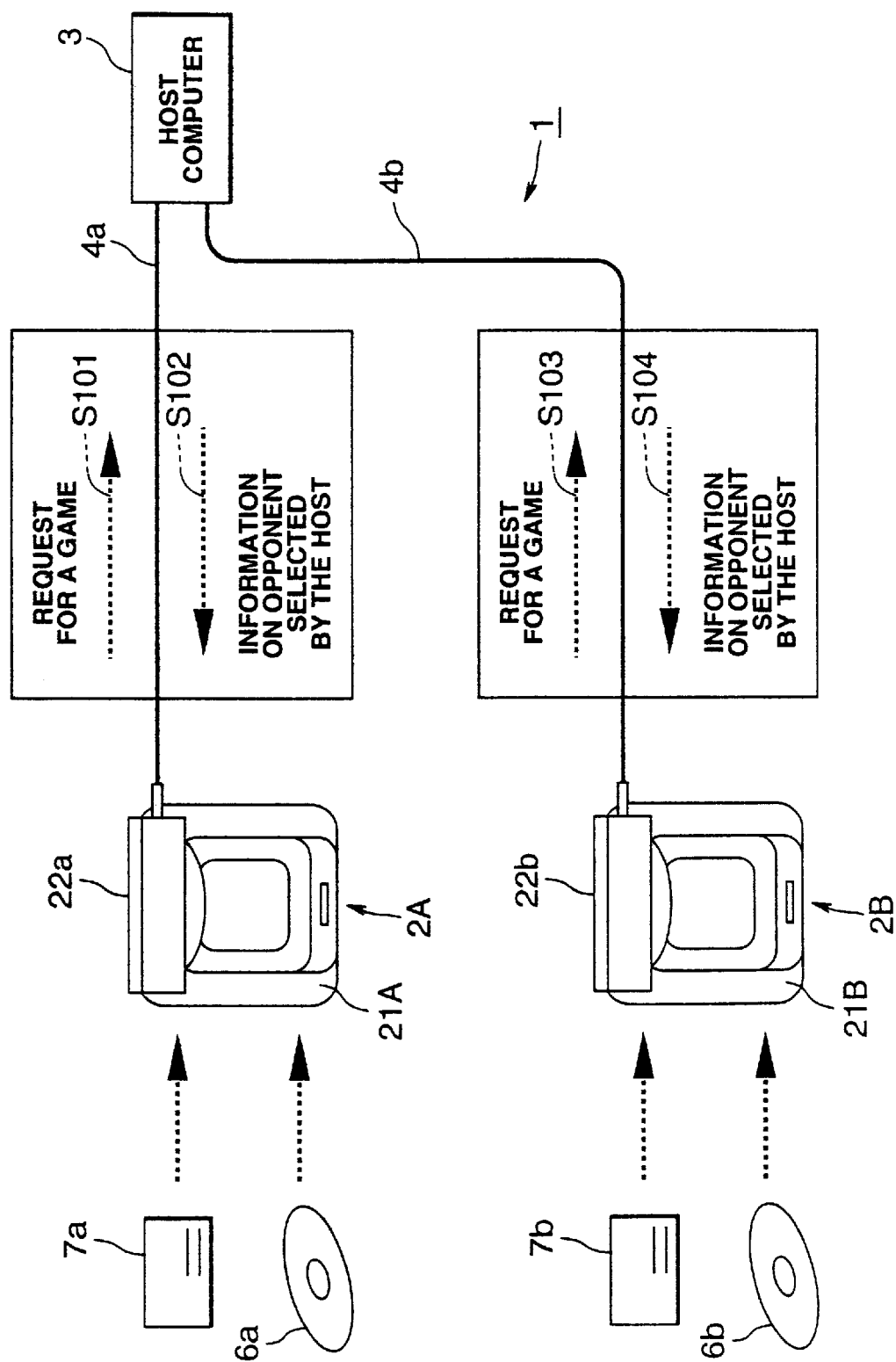
FIG. 10 is a block diagram showing the structure of the game system according to the second embodiment.

FIG. 10 is a block diagram showing the structure of the game system according to the second embodiment. The same reference numerals used in the first embodiment shall mean the same components, and explanation for such components will be omitted. Game devices 2A and 2B comprise modems 22a and 22b respectively, and are connected to the host computer 3 via the communication lines 4a and 4b. Although FIG.10 shows two game devices 2A and 2B connected to the host computer 3, it is possible to connect the same number of game devices as the number of players.

Figure 11:
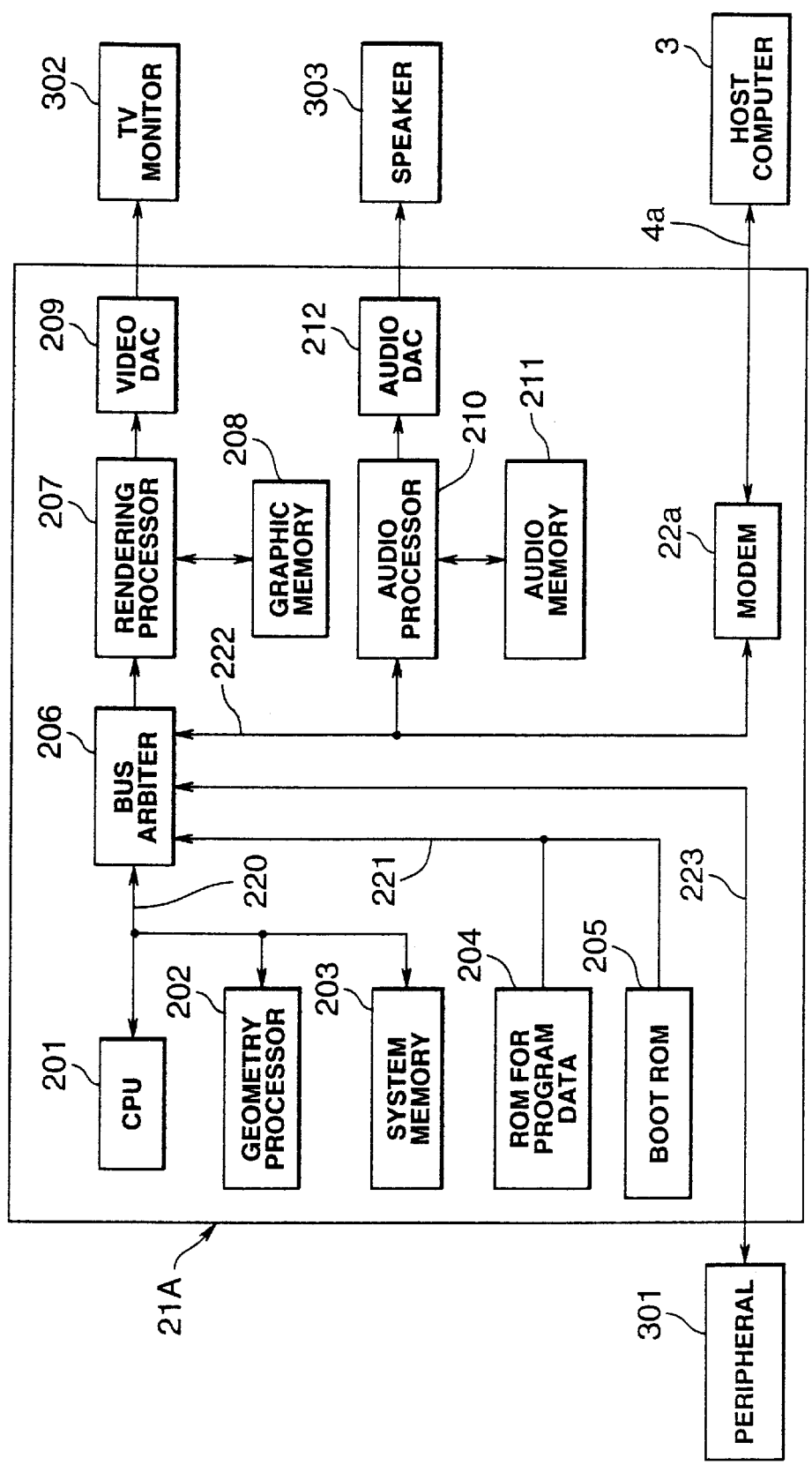
FIG. 11 is a block diagram showing the outline of the TV game machine of the aforementioned game system.

As shown in FIG. 11, the main body 21A comprises a CPU 201, a geometry processor 202, a system memory 203, a ROM 204 for program data, a boot ROM 205, a bus arbiter 206, a rendering processor 207, a graphic memory 208, a video DAC 209, an audio processor 210, an audio memory 211, an audio DAC 212, and a modem 22a. The bus arbiter 206 distributes occupation rights of the bus lines 220, 221, 222 and also controls data reception and transmission of respective hardware.

After the power is switched on, the CPU 201 reads the startup program stored in the boot ROM 205 and starts the system, and executes processing related to various computation and control pursuant to a program stored in the system memory 203.

Shape data (three-dimensional data such as characters, landscapes, background images consisting of apexes), etc. consisting of a plurality of polygons are previously stored in the ROM 204 for program data. These shape data are sent to the geometry processor 202 through bus arbiter 206. The geometry processor 202 implements transparent conversion of designated shape data at a conversion matrix sent from the CPU 201, and obtains shape data which have been converted from a three-dimensional virtual space coordinate system to a visual field coordinate system. These shape data are sent to the rendering processor 207 via the bus arbiter 206.

The rendering processor 207 is connected to the graphic memory 208 and the video DAC 209. The rendering processor 207 reads texture data from the graphic memory 208, pastes such texture to shape data of the converted visual field coordinate system and outputs the shape data to the frame buffer in the video DAC 209. Front images (character screens), word information and other background images (scroll screens) temporarily stored in the frame buffer are synthesized according to designated priorities and final frame image data are produced every certain period of time. After digital/analog conversion, the frame image data are sent to a TV monitor 302 and displayed in real time as a game screen.

Furthermore, an audio processor 210 is connected to an audio memory 211 and an audio DAC 212. The audio processor 210 produces acoustic data according to instructions provided from the CPU 201 and outputs such data to a speaker 303 via the audio DAC 212.

Moreover, the modem 22a is connected to the host computer 3 via the communication line 4a, and is structured such that a telecommunication game may be played with other game devices via the host computer 3. Peripheral data supplied from a peripheral 301 (controller pad, etc.) are structured to allow the data to be supplied to the CPU 210 via the bus line 223 and the bus arbiter 206. The CPU 201 interprets peripheral data corresponding to the input operation of the player and executes the game program.

The main body 21B has the same structure as explained above.

Figure 12:
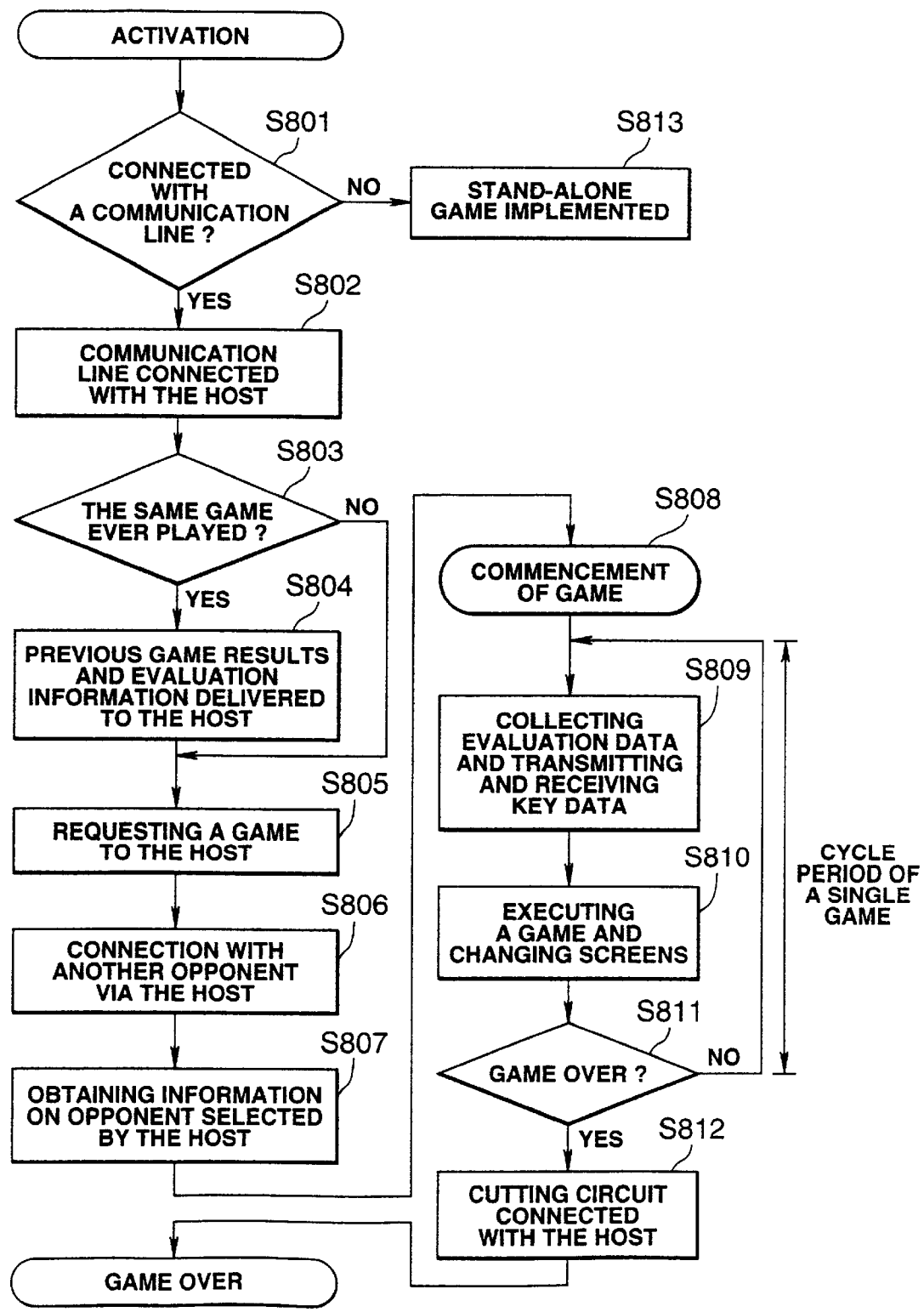
FIG. 12 is a flowchart explaining the operation of the main body of the game device of the aforementioned game system.

Next, the operation of the main body 21A will be explained with reference to FIG. 12. When the power of the main body 21A is switched to, the CPU 201 determines whether or not the modem 22a is connected to the communication line 4a (S801). If the CPU 201 determines that the modem 22a is not connected to the communication line (S801; NO), a stand-alone game will be played (S813).

On the other hand, if the CPU 201 determines that the modem 22a is connected to the communication line 4a (S801; YES), the CPU 201 connects the game device to the host computer 3 through the communication line 4a (S802).

Thereafter, the CPU 201 determines whether or not a competition-type telecommunication game has been processed via the host computer 3 theretofore (S803). If the processing of a competition-type telecommunication game is identified (S803; YES), the CPU 201 delivers the result of the processed game to the host computer 3 (S804) and shifts to the next processing. Contrarily, if the processing of a competition-type telecommunication game is not identified (S803; NO), the CPU 201 does not perform any processing and shifts to the next processing (S805).

Subsequently, the CPU 201 delivers a request for a competition-type game to the host computer 3 (S805, S101 in FIG. 10). The host computer selects an appropriate game device (for example, the game device 2B in FIG. 10) among game devices connected to it. As a consequence, the game device 2A is connected to an opponent (the game device 2B in FIG. 10) via the host computer 3 and the communication line 4b (S806).

Information on the opponent selected by the host computer 301 and other information are provided to the CPU 201 (S807, S102 in FIG. 10). Such information is stored in the modem 22a, the system memory 203 of the main body 21A, etc. According to the information stored, the CPU 201 synchronizes with the game device of the opponent, and starts a game (S808).

The CPU 201 collects evaluation information, and also transmits and receives data on the peripheral 301 and other information (S809). Furthermore, the CPU 201 of the main body 21a executes the game, renews the screen, and forms sounds (S810). The CPU 201 determines whether or not the game is over (S811). If the game is not over (S811; NO), processing from S809 will be repeated.

Moreover, when the CPU 201 of the main body 21A determines that the game is over (S811; YES), communication with the host computer 3 is cut off (S812), and the game will be over.

In the explanation above, information on the game results, etc. is sent to the host computer 3 at S804. However, the game device may be structured such that, after the game is over, the aforementioned information is sent to the host computer 3 before the communication line with the host computer is cut off (S812).

The game device 2B is structured to operate in the same way as the game device 2A. For example, if the game device 2B requests a game to the host computer 3 (S103 of FIG. 1), the host computer 3 will select an appropriate opponent (for example, game device 2A) and transmit information on such opponent to the game device 2B (S104 in FIG. 10), and the game device 2B will be connected with the game device 2A through the communication line 4b, the host computer 3 and the communication line 4a.

According to the present embodiment, each game device may conduct a competition-type telecommunication game while being connected to the host computer.

[Effect of the Invention]

As described above, the present invention has the following effects.

(1) For the purpose of evaluating the skills of the players, the host information processing means stores evaluated values and other information required for the processing of the game. Accordingly, by using these values and information, the skills of the players may be evaluated more objectively.

(2) By devising the managing period and processing of information such as game results, skills of the players may be evaluated more objectively. For example, skills of new players are objectively evaluated after a prescribed number of games. As a result, there is no disadvantage among the players depending on the number of games previously experienced.

(3) Upon changes in the skills of existing teams or individuals, evaluated values may be modified in conformity with their current skills. Accordingly, the players will always feel that the terms of the game conforms with their actual skill, and the amusement of the game is thereby enhanced.

What is claimed is:

1. A game system comprising:
   a plurality of game devices which are connected through a public network; and
   a host computer for selecting, at the request of at least one of said game devices, a game device to become an opponent, and for controlling a competition-type game,
   wherein said host computer receives information on at least one of a difference in scores and a result of the competition-type game from at least one of said game devices through the public network, and renews a skill level of a player after the competition-type game by giving an evaluation, based on at least one of the difference in scores and the result of the competition-type game, that increases as ability of the opponent at the time of starting the competition-type game exceeds ability of the player.

2. A game system comprising:
   a plurality of game devices which are connected through communication lines; and
   a host computer for selecting, at the request of at least one of said game devices, a game device to become an opponent, and for controlling a competition-type game,
   wherein said host computer comprises receiving means for receiving information on at least one of a difference in scores and a result of the competition-type game from at least one of said game devices through at least one of said communication lines, and evaluation means for renewing a skill level of a player after the competition-type game by giving an evaluation, based on at least one of the difference in scores and the result of the competition-type game, that increases as ability of the opponent at the time of starting the competition-type game exceeds ability of the player; and
   wherein at least one of said game devices comprises a game body for processing competition-type games and communication means for connecting the game body with said host computer or a game device of an opponent through at least one of said communication lines.

3. The game system according to 1 or 2, wherein each of the plurality of game devices performing the competition-type games cuts off communication with said host computer after obtaining from the host computer opponent information necessary for processing the competition-type game, connects to the game device of an opponent through a communication line, and performs the competition-type game.

4. The game system according to claim 1 or 2, wherein said host computer evaluates said at least one of the difference in scores and the result of the competition-type game by emphasizing one or more recently played games.

5. The game system according to claim 1 or 2, wherein said host computer evaluates said at least one of the difference in scores and the result of the competition-type game at prescribed times when the game device performs the competition-type game.

6. The game system according to claim 1 or 2, wherein at least one of said game devices makes game data into a packet and attaches a check sum to the packet upon a delivery of the game data, and when a packet of the game data of an opponent is received with a check sum, the game device calculates the check sum and compares the calculated check sum with the check sum being delivered, and when the calculated check sum and the check sum being delivered do not conform as a result of the comparison, a packet of the game data is retransmitted with a check sum.

7. The game system according to claim 1 or 2, wherein at least one of said game devices maintains the result of the competitive-type game when the competition-type game is finished between the player and the opponent and delivers the results to the host computer when making a request for another game to the host computer.

8. A terminal device used for the game system according to any one of claims 1 or 2.

9. A storage medium, which can be read by a computer, for storing a program which causes the computer to function as a host computer in a game system in which a plurality of game devices are connected through a network, and to perform a method of selecting, at the request of at least one of said game devices, a game device to become an opponent, and of controlling a competition-type game, the method comprising:

receiving information on at least one of a difference in scores and a result of the competition-type game from at least one of said game devices through the network; and renewing a skill level of a player after the competition-type game by giving an evaluation, based on at least one of the difference in scores and the result of the competition-type game, that increases as ability of the opponent at the time of starting the competition-type game exceeds ability of the player.

* * * * *

UNITED STATES PATENT AND TRADEMARK OFFICE
CERTIFICATE OF CORRECTION

PATENT NO.      : 6,475,089 B1                                              Page 1 of 1
DATED           : November 5, 2002
INVENTOR(S)     : Hiroyasu Lee It is certified that error appears in the above-identified patent and that said Letters Patent is hereby corrected as shown below:

<u>Column 14,</u>
Line 60, after "according to" insert -- claim --.

Signed and Sealed this

Sixteenth Day of September, 2003

JAMES E. ROGAN
*Director of the United States Patent and Trademark Office*